US010731623B2

United States Patent
Ishida et al.

(10) Patent No.: US 10,731,623 B2
(45) Date of Patent: Aug. 4, 2020

(54) WATER-FLOW POWER GENERATING APPARATUS

(71) Applicant: MITSUBISHI HEAVY INDUSTRIES, LTD., Tokyo (JP)

(72) Inventors: Hiroyuki Ishida, Tokyo (JP); Shinkichi Tanigaki, Tokyo (JP); Shin Asano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/480,816

(22) PCT Filed: Jan. 26, 2018

(86) PCT No.: PCT/JP2018/002521
§ 371 (c)(1),
(2) Date: Jul. 25, 2019

(87) PCT Pub. No.: WO2018/139590
PCT Pub. Date: Aug. 2, 2018

(65) Prior Publication Data
US 2019/0390646 A1    Dec. 26, 2019

(30) Foreign Application Priority Data

Jan. 26, 2017 (JP) .................................. 2017-012251
Jan. 31, 2017 (JP) .................................. 2017-016218

(51) Int. Cl.
*F03B 13/26* (2006.01)
*F03B 13/10* (2006.01)

(52) U.S. Cl.
CPC ............ *F03B 13/264* (2013.01); *F03B 13/10* (2013.01); *F05B 2240/50* (2013.01); *F05B 2240/57* (2013.01)

(58) Field of Classification Search
CPC ...... F03B 13/264; F03B 13/10; F03B 17/061; F03B 11/06; Y02E 10/28; F05B 2240/50; F05B 2240/57; F05B 2240/52
(Continued)

(56) References Cited

U.S. PATENT DOCUMENTS 5,046,920 A * 9/1991 Higashi ............... F03B 11/06
415/111
8,766,466 B2    7/2014 Dehlsen et al.
(Continued)

FOREIGN PATENT DOCUMENTS

CN    201184267 Y    1/2009
CN    202108767 U    1/2012
(Continued)

OTHER PUBLICATIONS

International Search Report and Written Opinion dated Mar. 20, 2018, issued in Application No. PCT/JP2018/002521, with English translation (14 pages).
(Continued)

*Primary Examiner* — Charles Reid, Jr.
(74) *Attorney, Agent, or Firm* — Westerman, Hattori, Daniels & Adrian, LLP

(57) ABSTRACT

A water-flow power generating apparatus includes a blade, a rotary part, a power generating unit, a nacelle, and a bearing unit. The blade rotates with power of a water flow. The rotary part is connected to the blade and rotates integrally with the blade. The power generating unit is connected to the rotary part and generates electricity with a rotation force of the rotary part. The nacelle covers the power generating unit, forms a boundary between an inner space in which the power generating unit is disposed and an underwater in which the blade is disposed. The bearing unit supports the rotary part. The bearing unit includes a thrust
(Continued)

bearing disposed in the inner space and supporting the rotary part from an axial direction of the rotary part, and a journal bearing disposed between the nacelle and the blade and supporting the rotary part from a radial direction.

6 Claims, 9 Drawing Sheets

(58) Field of Classification Search
    USPC .................................................. 290/43, 54
    See application file for complete search history.

(56) References Cited

U.S. PATENT DOCUMENTS

| | | | |
|---|---|---|---|
| 9,080,548 | B2 | 7/2015 | Dehlsen et al. |
| 2007/0284884 | A1* | 12/2007 | Stothers ............... F03B 17/061 |
| | | | 290/54 |
| 2009/0278357 | A1* | 11/2009 | Williams ............ F16C 32/0423 |
| | | | 290/53 |
| 2016/0327014 | A1* | 11/2016 | Trevarthen ............. F03B 13/22 |

FOREIGN PATENT DOCUMENTS

| | | |
|---|---|---|
| CN | 203567922 U | 4/2014 |
| GB | 2509365 A | 7/2014 |
| JP | 2014-62470 A | 4/2014 |
| JP | 2014-534375 A | 12/2014 |
| JP | 2015-127577 A | 7/2015 |
| JP | 2015-145628 A | 8/2015 |

OTHER PUBLICATIONS

Office Action dated Apr. 17, 2020, issued in counterpart CN application No. 201880008618.9, with English translation. (15 pages).

* cited by examiner

WATER-FLOW POWER GENERATING APPARATUS

FIELD

The present invention relates to a water-flow power generating apparatus.

BACKGROUND

Water-flow power generating apparatuses that generate electricity by utilizing the energy of a water flow of oceans or rivers (an ocean current, a tidal current, a river current), are attracting attention. Such a water-flow power generating apparatus is installed in the water and includes a rotor that includes blades to receive a water flow, a power generating unit that converts a rotation force of a rotor into electrical energy, and a nacelle that covers the power generating unit from outside. As such a water-flow power generating apparatus, an apparatus described in, for example, the following Patent Literature 1 has been known. The apparatus described in Patent Literature 1 includes, as a bearing unit for supporting a rotor in a rotatable manner, a thrust bearing that supports the axial direction load of the rotor and a radial bearing that supports the radial direction load of the rotor. Each of these thrust bearing and radial bearing is a water lubricated bearing that takes in external water and uses the external water as a lubricant.

Moreover, hitherto, there have been known technologies relating to a water-flow power generating apparatus that generates electricity by utilizing the energy of a water flow of oceans or rivers (an ocean current, a tidal current, a river current). For example, in Patent Literature 2, disclosed has been a power generating apparatus equipped with a power pod that includes a floating pressure vessel and a rotor assembly to which blades are connected and generates electricity when the blades are driven by a water flow. In this water-flow power generating apparatus, the rotor assembly is supported rotatably relative to the floating pressure vessel by a fluid bearing.

CITATION LIST

Patent Literature

Patent Literature 1: Japanese Patent Application Laid-open No. 2015-145628
Patent Literature 2: Published Japanese Translation of PCT Application No. 2014-534375

SUMMARY

Technical Problem

However, since the water lubricated bearing needs to lower a contact surface pressure as compared with an oil lubricated bearing that has been widely used for general machines, the water lubricated bearing is required to have a large area as a contact surface of a bearing. In particular, in the case where a water lubricated bearing is used as a thrust bearing, the outer diameter of the bearing device may become larger than the outer diameter of the nacelle. For this reason, there is a room for improvement in the apparatus described in Patent Literature 1.

Moreover, in the water-flow power generating apparatus described in the above-described Patent Literature 2, to an end portion of the rotor assembly on a side opposite to the floating pressure vessel, attached is a floating tail cone (buoyancy material) that gives buoyancy to a power pod. In this way, by attaching the buoyancy material to the rotor assembly, the water weight of an exposed portion exposed to the underwater in the rotor assembly becomes small, whereby a load applied to a bearing is reduced. However, depending on the respective positions of a center of gravity and a center of buoyancy of the exposed portion of the rotor assembly, a moment that acts on the exposed portion by the weight and buoyancy of the exposed portion becomes large, which may result in that the rotor assembly becomes unable to maintain an attitude parallel to the axial direction. As a result, one-side uneven contact arises in the bearing surface of a bearing that supports the rotor assembly, and wear on the bearing surface is hastened.

The present invention has been made to solve the above-described problem and has an object to provide a water-flow power generating apparatus that is miniaturized and improved in efficiency.

Moreover, the present invention has been made in view of the above and has an object to provide a water-flow power generating apparatus capable of suppressing wear of a bearing that supports a rotary part that rotates with power of a water flow.

Solution to Problem

A water-flow power generating apparatus according to the present invention generates electricity with power of a water flow. The water-flow power generating apparatus includes a blade that rotates with power of the water flow; a rotary part that is connected to the blade and rotates integrally with the blade; a power generating unit that is connected to the rotary part and generates electricity with a rotation force of the rotary part; a nacelle that covers the power generating unit, forms a boundary between an inner space in which the power generating unit is disposed and an underwater in which the blade is disposed, and makes the inner space gas atmosphere; and a bearing unit that supports the rotary part with respect to the nacelle. The bearing unit includes a thrust bearing that is disposed in the inner space and supports the rotary part from an axial direction of the rotary part, and a journal bearing that is disposed between the nacelle and the blade and supports the rotary part from a radial direction orthogonal to the axial direction.

According to this configuration, since the journal bearing is provided in the water between the nacelle and the blades, the runout of the rotary part during rotation can be reduced more effectively. In addition, since the thrust bearing is provided in the inner space of the nacelle, an oil lubricated bearing can be applied to the thrust bearing. Accordingly, the physique of the bearding can be made small. With this configuration, the dimensional physique of the nacelle can be made small sufficiently. That is, since the nacelle can be made relatively small relative to the required diameter of the blades, it becomes possible to improve the efficiency of the water-flow power generating apparatus.

The water-flow power generating apparatus according to the present invention may include a journal fixing part that is connected to the nacelle and extends in the axial direction from the nacelle toward an underwater side; and a journal rotary part that is connected to the rotary part, is disposed on a radially outer side of the journal fixing part, and faces the journal fixing part.

The journal bearing is fixed to either one of the journal fixing part and the journal rotary part.

According to this configuration, since the journal bearing is provided in the water between the nacelle and the blades, the runout of the rotary part during rotation can be reduced more effectively. Moreover, since water can be used as a lubricant for the journal bearing, a used amount of lubricant oil as the entire apparatus can be reduced.

In the water-flow power generating apparatus according to the present invention, the journal rotary part may be provided with a rotary part through-hole passing through the journal rotary part in the radial direction, so as to take in water in the underwater as a lubricant between the journal bearing and the journal rotary part, and a lubricant water discharging through-hole passing through the journal rotary part in the radial direction at a position different in the axial direction from the rotary part through-hole, so as to discharge water as the lubricant.

According to this configuration, through the rotary part through-holes and the lubricant water discharging holes, it is possible to smoothly supply external water as a lubricant to the journal bearing or discharge external water from the journal bearing. In particular, since a sufficient amount of water can be taken in from the rotary part through-holes with the rotation of the rotary part, it is possible to lubricate the journal bearing without providing other devices for supplying water to the journal bearing.

In the water-flow power generating apparatus according to the present invention, the bearing unit may include a lubricating oil supplying unit that supplies lubricating oil to the thrust bearing.

According to this configuration, since an oil lubricated bearing is used as the thrust bearing, as compared with a case where a water lubricated bearing is used as the thrust bearing, it is not necessary to take measures to ensure the water tightness of the thrust bearing itself. With this configuration, it is possible to make the dimensional physique of the nacelle small sufficiently. Therefore, it is possible to miniaturize the dimensional physique of the apparatus sufficiently.

In the water-flow power generating apparatus according to the present invention, the blade may have a diameter of 20 m or more.

With this configuration, it becomes possible to improve the efficiency of the water-flow power generating apparatus more.

To solve the above-mentioned problems and to achieve the object, the present invention provides a water-flow power generating apparatus that generates electricity with power of a water flow. The water-flow power generating apparatus includes a blade that rotates with power of the water flow; a rotary part that rotates integrally with the blade; a power generating unit that is connected to the rotary part and generates electricity with a rotation force of the rotary part; a nacelle that covers the power generating unit, forms a boundary between a space in which the power generating unit is disposed and an underwater in which the blade is disposed, and makes the space in which the power generating unit is disposed, gas atmosphere; and a journal bearing that supports the rotary part to be rotatable with respect to the nacelle in the radial direction of the rotary part. When a moment acts on an exposed portion exposed to the underwater on the outside of the nacelle in the rotating portion by weight at a center of gravity and buoyancy at a center of buoyancy, among a reaction force received by one end of the journal bearing from the nacelle and a reaction force received by the other end from the nacelle, a ratio of a larger one to a smaller one is 1.5 or less.

In the water-flow power generating apparatus according to the present invention, when a moment acts on the exposed portion by weight at a center of gravity and buoyancy at a center of buoyancy, among a reaction force received from the nacelle by one end of the journal bearing that supports the rotary part in the radial direction and a reaction force received from the nacelle by the other end, a ratio of a larger one to a smaller one is 1.5 or less. Thereby, it is possible to equalize the reaction forces received from the nacelle by the one end and the other end of the journal bearings, and it becomes possible to suppress a matter that one-end uneven contact occurs on the bearing surface of the journal bearings and a surface pressure increases locally. Therefore, according to the water-flow power generating apparatus according to the present embodiment, it is possible to suppress wear of the bearing that supports the rotary part that rotates with the force of a water flow.

Moreover, it is preferable that the exposed portion of the rotary part includes a plurality of buoyancy materials provided with the center of gravity in the axial direction of the rotary part interposed therebetween. With this configuration, it is possible to equalize the buoyancy acting on the exposed portion on both sides, in the axial direction, of the center of gravity. Accordingly, the center of buoyancy of the exposed portion can be brought close to the center of gravity. As a result, since it is possible to adjust so as to easily reduce a moment that acts on the exposed portion by the weight at the center of gravity and the buoyancy at the center of buoyancy, among a reaction force received by one end of the journal bearings and a reaction force received by the other end, it becomes easy to make the ratio of the larger one to the smaller one 1.5 or less.

Preferably, the exposed portion of the rotary part includes the bottom portion and the cylindrical side wall portion that extends in the axial direction from the bottom portion towards the nacelle side and to which the blades are connected and the buoyancy materials include a first buoyancy material attached to the bottom portion and a second buoyancy material attached to the side wall portion. With this configuration, by utilizing the axial length of the cylindrical portion to which the blades are connected, it becomes easy to dispose the second buoyancy material on a side opposite to the first buoyancy material across the center of gravity of the exposed portion. That is, it is possible to provide comparatively easily the buoyancy materials at respective positions with the center of gravity interposed therebetween in the axial direction.

Moreover, it is preferable to include a cylindrical buoyancy material that accommodates portions other than the blades of the exposed portion of the rotary part. This configuration makes it possible to equalize buoyancy acting on the exposed portion on both sides, in the axial direction, of the center of gravity of the exposed portion, and thus it is possible to bring the center of buoyancy of the exposed portion close to the center of gravity.

Advantageous Effects of Invention

According to the present invention, it is possible to provide a water-flow power generating apparatus that is miniaturized and improved in efficiency.

Moreover, the water-flow power generating apparatus according to the present embodiment exerts an effect that it is possible to suppress wear of a bearing that supports the rotary part that rotates with power of a water flow.

DESCRIPTION OF EMBODIMENTS

Hereinafter, although an embodiment of the present invention is described with reference to the drawings, the present invention is not limited to the configuration of the following embodiment. It is also possible to adopt a configuration that does not use some of the constitutional components described below.

A water-flow power generating apparatus 201 is disposed in the water and generates electricity with the energy of a water flow. The water-flow power generating apparatus 201 is disposed, for example, in the sea and generates electricity by converting ocean current energy or tidal current energy into electric power. In this connection, the water-flow power generating apparatus 201 may be disposed in a river.

Figure 1:
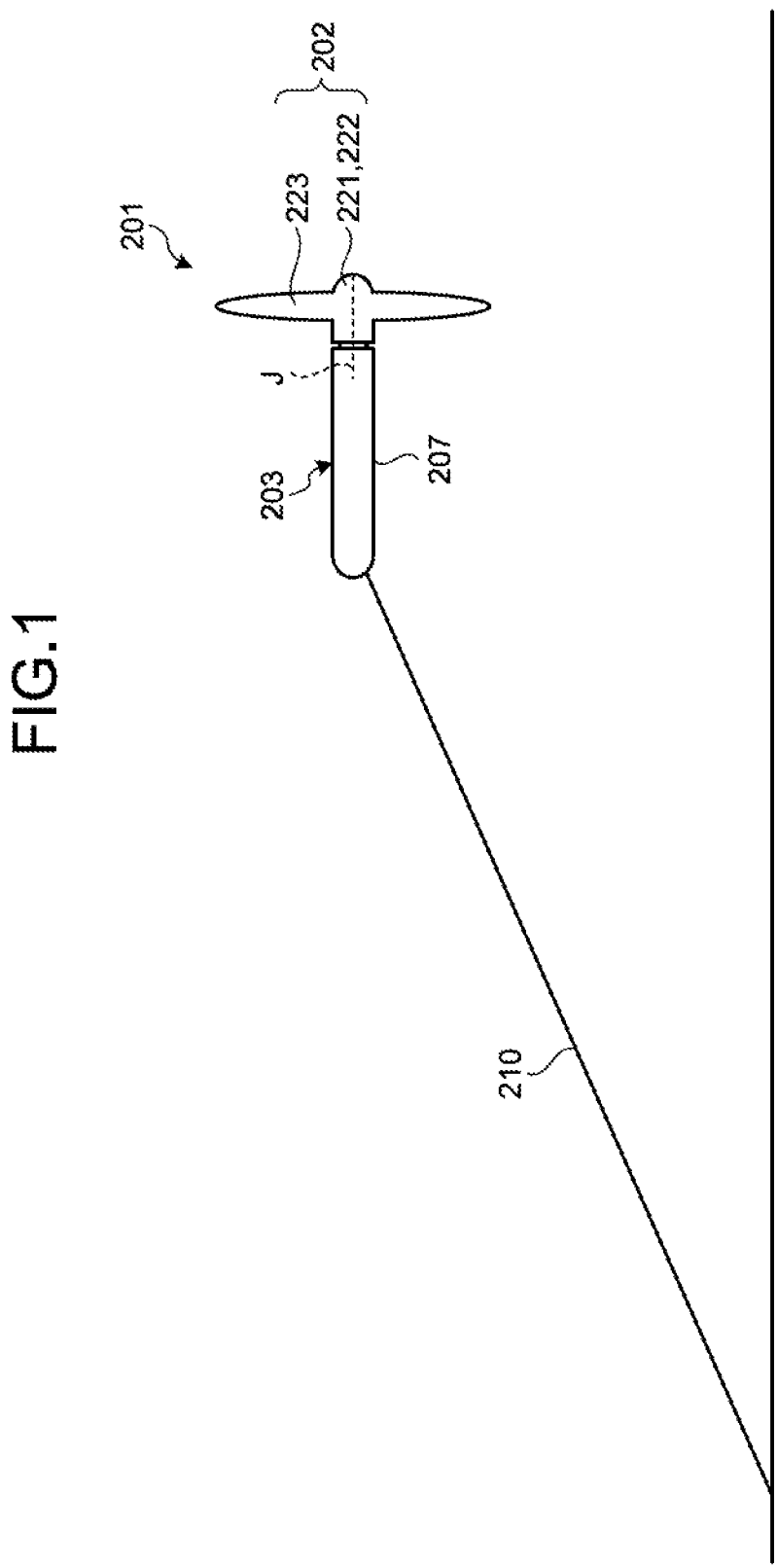
FIG. 1 is an overall view of a water-flow power generating apparatus according to an embodiment of the present invention.

In the present embodiment, the water-flow power generating apparatus 201 is a type called an underwater floating system. As illustrated in FIG. 1, the water-flow power generating apparatus 201 is moored to the sea bottom through a cable (mooring cable 210). That is, in accordance with the flowing direction of an ocean current, the water-flow power generating apparatus 201 is able to change its attitude freely.

Figure 2:
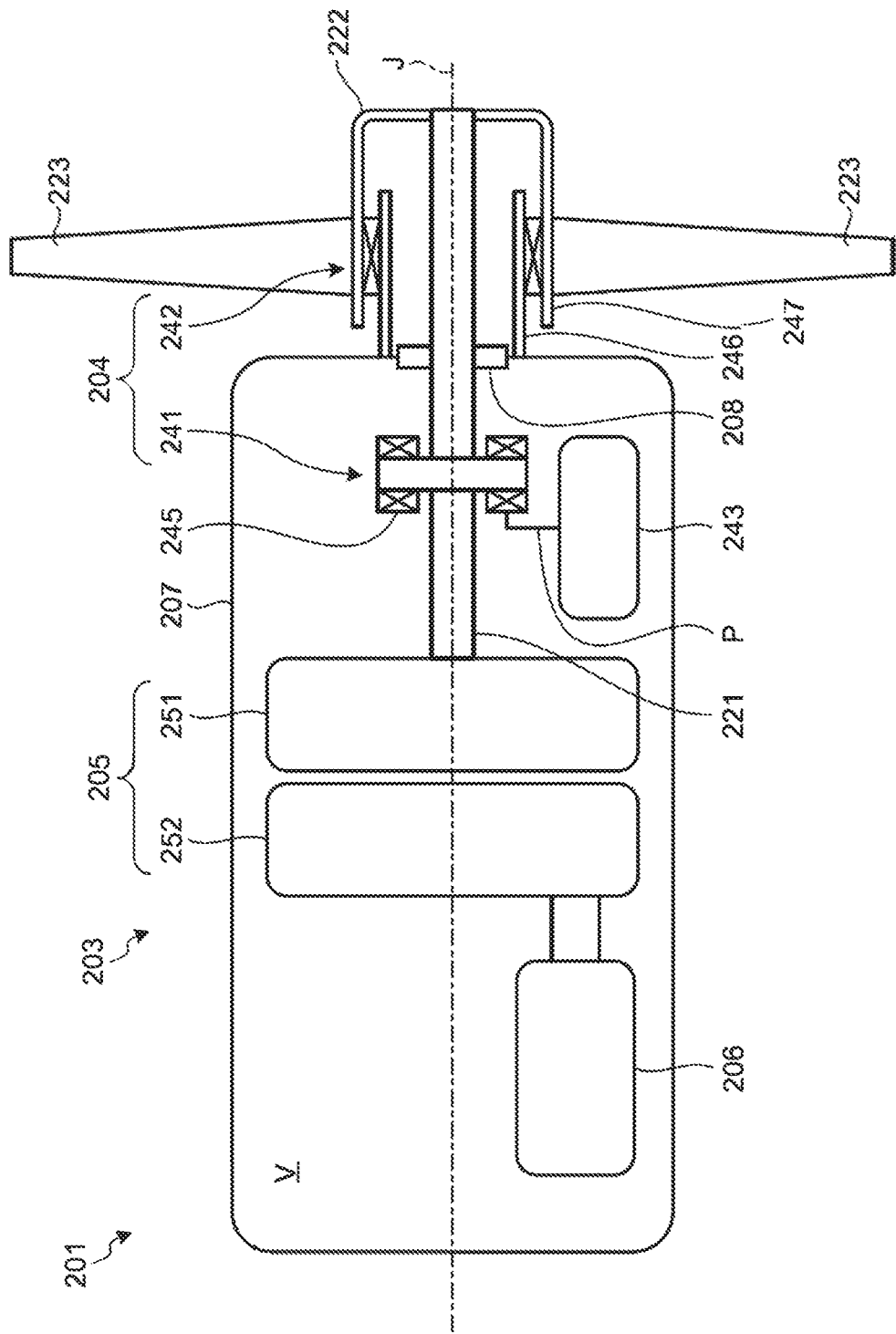
FIG. 2 is a schematic diagram illustrating a configuration of the water-flow power generating apparatus according to the embodiment of the present invention.

As illustrated in FIG. 1 and FIG. 2, the water-flow power generating apparatus 201 includes a rotor (rotary part) 202 that rotates about an axis line (axis) J, a stator 203 that supports the rotor 202, and a bearing unit 204 disposed between the rotor 202 and the stator 203. The rotor 202 includes a pillar-shaped rotor main body 221 extending along the axis line J, a rotor head 222 provided on one side, in the axis-line-J direction, of the rotor main body 221, and a plurality of blades 223 radially extending from the rotor head 222 toward the radially outer side of the axis line J. Each of the blades 223 has a wing-shaped portion when viewed from its extending direction. The diameter of the blade 223 is desirably 20 m or more.

In the present embodiment, the number of blades to be provided is not limited uniquely and may be decided appropriately according to a design or specification. The blades 223 are exposed in the water. When a water flow hits the blades 223, the rotor main body 221 rotates about the axis line J by the energy of the water flow acting on the blades 223.

The stator 203 includes a drive train 205, a power generator (power generating unit) 206, and a nacelle 207 that covers the drive train 205 and the power generator 206 from outer side. The inner side of the nacelle 207 is made an inner space V where water tightness is maintained. That is, the nacelle 207 forms a boundary between the inner space V and the underwater. The rotor main body 221 passes through a wall of the nacelle 207 on one side of the axis-line-J direction. In order to keep the inner space V of the nacelle 207 watertight, a seal member 208 is provided between the nacelle 207 and the outer peripheral surface of the rotor main body 221.

The inner space V of the nacelle 207 is filled with gas, such as air. That is, the inner space V is made an air atmosphere. The drive train 205 and the power generator 206 are disposed in the inner space V. The drive train 205 transmits the rotation of the rotor main body 221 to the power generator 206. As the drive train 205, a speed increasing mechanism using hydraulic pressure is used.

Specifically, the drive train 205 includes a hydraulic pump 251 and a hydraulic motor 252. The hydraulic pump 251 pressurizes a hydraulic oil with rotation of the rotor main body 221 and supplies it to the hydraulic motor 252. The hydraulic motor 252 takes out the energy of the high-pressure hydraulic oil supplied from the hydraulic pump 251, adds a rotation force to the rotor main body 221, and drives the power generator 206. Although not illustrated in detail, the drive train 205 may include a brake used to stop the rotation of the rotor 202 and a cooling device for cooling a hydraulic oil.

The bearing unit 204 includes a thrust bearing 241 that supports a load of the rotor 202 in the axis-line-J direction, a journal bearing 242 that supports a load of the rotor 202 in the radial direction, and a lubricating oil supplying unit 243 that supplies lubricating oil to the thrust bearing 241. The thrust bearing 241 includes a flange portion 244 provided on an extended midway portion of the rotor main body 221 on the inner-space-V side of the nacelle 207 and thrust bearing main bodies 245 that sandwich the flange portion 244 from both sides in the axis-line-J direction. The lubricating oil supplying unit 243 supplies lubricating oil between the thrust bearing main bodies 245 and the flange portion 244 through an oil pipe path P. The rotor main body 221 is a member formed integrally in the axis-line-J direction, and does not have any auxiliary members such as coupling on its extended midway portion. With this configuration, the thrust bearing 241 can support a load (thrust load) added to the rotor main body 221 from the axis-line-J direction.

Figure 3:
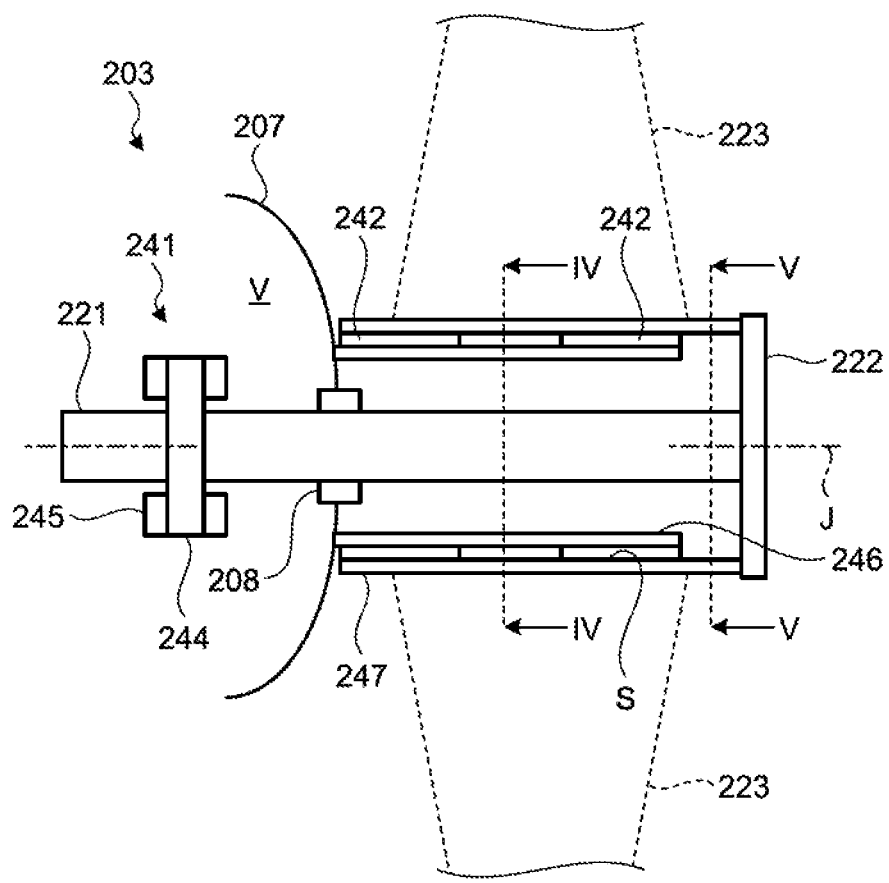
FIG. 3 is a principal part enlarged view of the water-flow power generating apparatus according to the embodiment of the present invention.

The journal bearing 242 is provided in an inner portion of the rotor head 222, not in the inner space V of the nacelle 207. As illustrated in detail in FIG. 3, on an end portion of the nacelle 207 on one side of the axis-line-J direction, a journal fixing part 246 is provided.

Moreover, in the rotor head 222, a portion on the other side of the axis-line-J direction is a journal rotary part 247. The journal bearing 242 is disposed between the journal fixing part 246 and the journal rotary part 247. The above-mentioned blades 223 are disposed at positions corresponding to the journal bearing 242 in the axis-line-J direction. With this configuration, it is possible to more stably support a radial direction load added to the blades 223.

Figure 4:
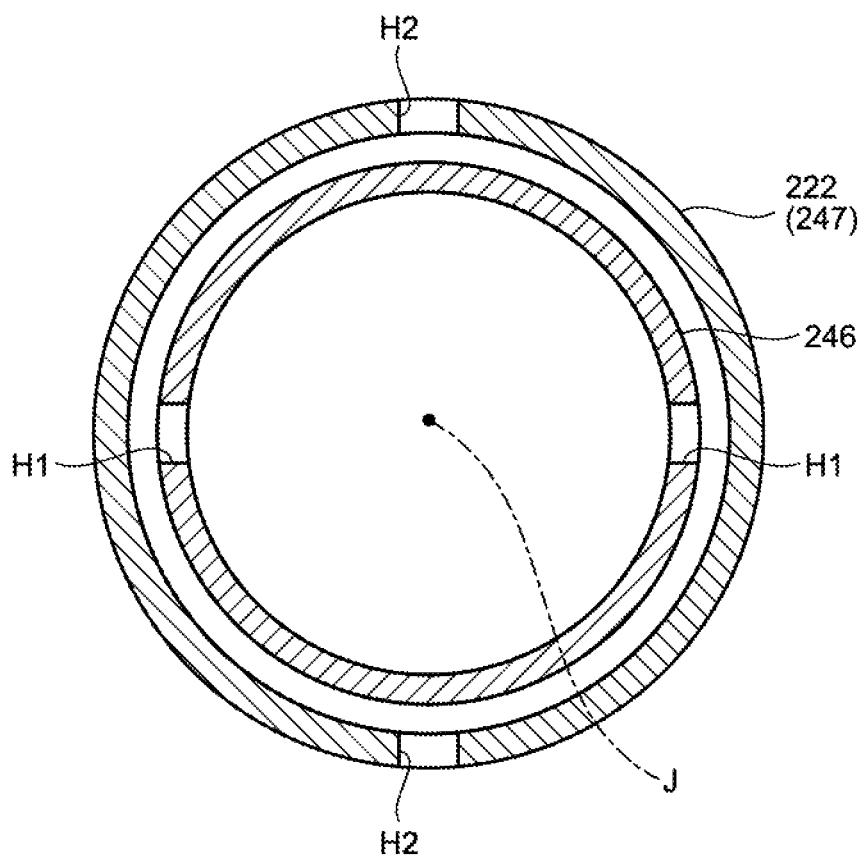
FIG. 4 is a sectional view along line IV-IV in FIG. 3.

The journal fixing part 246 is protruded cylindrically from an external surface of the nacelle 207 toward one side of the axis-line-J direction. An end portion of the journal fixing part 246 on one side of the axis-line-J direction is opened in the axis-line-J direction. Furthermore, as illustrated in FIG. 4, in the journal fixing part 246, a pair of fixing part through-holes H1 that pass through the journal fixing part 246 in the radial direction of the axis line J are formed. The pair of fixing part through-holes H1 are formed with an interval of 180 degrees in the circumferential direction when viewed from the axis-line-J direction.

The journal bearing 242 is fixed to an outer peripheral surface of the journal fixing part 246. The journal bearing 242 may be fixed to an inner peripheral surface of the journal rotary part 247. In the present embodiment, a pair of journal bearings 242 are disposed with a space interposed therebetween in the axis-line-J direction.

The journal rotary part 247 is disposed on a radially outer side of the journal fixing part 246 with a pair of journal bearings 242 interposed therebetween. The journal rotary part 247 is shaped in a cylinder extending in the axis-line-J direction. An inner peripheral surface of the journal rotary part 247 is a sliding surface S that comes in contact with an outer peripheral surface of the journal bearing 242. As illustrated in FIG. 4, in the journal rotary part 247, a pair of rotary part through-holes H2 that pass through the journal rotary part 247 in the radial direction of the axis line J are formed. The pair of rotary part through-holes H2 are formed with an interval of 180 degrees in the circumferential direction when viewed from the axis-line-J direction.

One end of the rotary part through-holes H2 are opened to the underwater. Therefore, through the rotary part through-holes H2, water (sea water) is taken in toward a radial direction inner side. The taken-in water acts as a lubricant that lubricates the outer peripheral surface of the journal bearing 242 and the sliding surface S. In more concrete terms, between the outer peripheral surface of the journal bearing 242 and the sliding surface S, an extremely thin water film is formed. Since water is incompressible fluid, in the case where a force acts from the outside, the water film generates a reaction force against the force. Therefore, even in the case where shaft runout arises in the rotor main body 221, it is possible to correct the shaft runout by the reaction force of the water film. The water used for the lubrication between the outer peripheral surface of the journal bearing 242 and the sliding surface S further flows toward a radial direction inner side through the fixing part through-holes H1.

Figure 5:
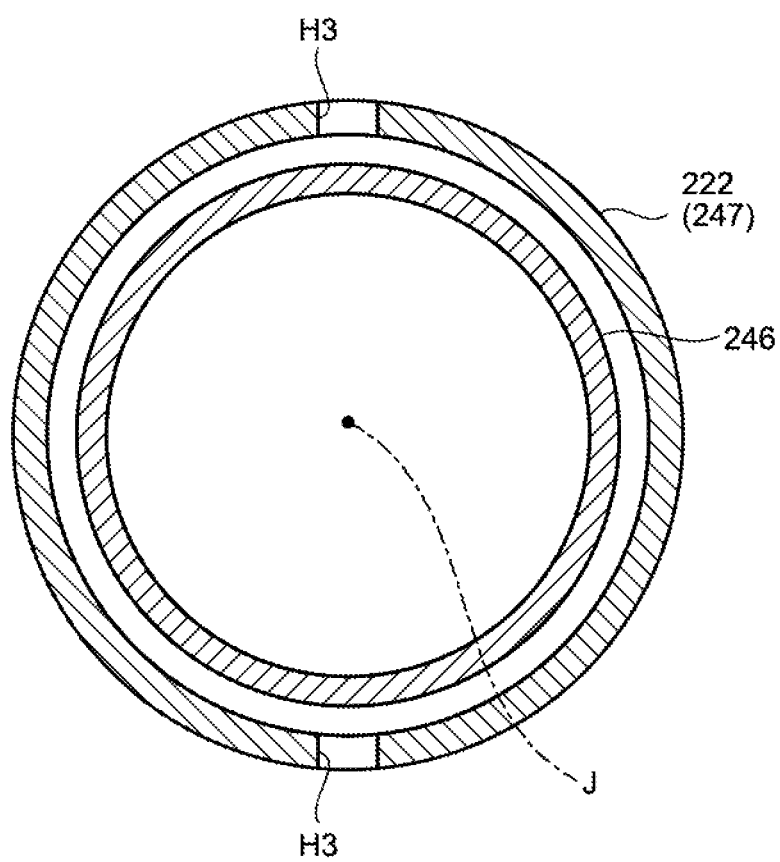
FIG. 5 is a sectional view along line V-V in FIG. 3.

Furthermore, as illustrated in FIG. 5, on positions in the axis-line-J direction different from those in FIG. 4 (positions between an edge of the blades 223 on one side in the axis-line-J direction and the rotor head 222), a pair of lubricant water discharging holes H3 that pass through the journal rotary part 247 in the radial direction of the axis line J, are formed. The pair of lubricant water discharging holes H3 are formed with an interval of 180 degrees in the circumference direction when viewed from the axis-line-J direction. The water used for the lubrication between the outer peripheral surface of the journal bearing 242 and the sliding surface S is discharged to the outside through these lubricant water discharging holes H3.

Successively, the operation of the water-flow power generating apparatus 201 will be described. The water-flow power generating apparatus 201 is utilized in a state where it is moored to the sea bottom with the mooring cable 210. When an ocean current hits the blades 223, the rotor main body 221 provided integrally with the blades 223 rotates about the axis line J by the kinetic energy of the ocean current. After the rotation of the rotor main body 221 is accelerated through the above-described drive train 205, the rotation is transmitted to the power generator 206. With this configuration, the power generator 206 generates electric power. The electric power is taken out to the outside through a submarine cable etc. and is provided for various uses.

In order to generate electricity efficiently, it is desired to reduce the runout of the rotor 202 including the blades 223 during their rotation. Moreover, it is also important to secure a relatively large diameter of the blades 223 relative to the size of the stator 203. According to the above-described configuration, since the journal bearing 242 is provided in the water between the nacelle 207 and the blades 223, the runout of the rotor 202 during rotation can be reduced more effectively. In addition, since the thrust bearing 241 is provided in the inner space V of the nacelle 207, an oil lubricated bearing can be applied to the thrust bearing 241. Accordingly, its physique can be made small. With this configuration, the dimensional physique of the nacelle 207 can be made small sufficiently. That is, since the nacelle 207 can be made relatively small relative to the required diameter of the blades 223, an effective area of the blades 223 can be secured largely. With this configuration, it becomes possible to improve the efficiency of the water-flow power generating apparatus 201.

In the above-described embodiment, the journal rotary part 247 has the rotary part through-holes H2 passing through the journal rotary part 247 in the radial direction, so as to take water into the sliding surface S between the journal bearing 242 and the journal rotary part 247 as a lubricant. Furthermore, in the journal rotary part 247 has the lubricant water discharging holes H3 passing through the journal rotary part 247 in the radial direction, so as to discharge the water as a lubricant. According to this configuration, through the rotary part through-holes H2 and the lubricant water discharging holes H3, it is possible to smoothly supply external water as a lubricant to the journal bearing or discharge external water from the journal bearing. In particular, since a sufficient amount of water can be taken in from the rotary part through-holes H2 with the rotation of the rotor 202, it is possible to lubricate the journal bearing 242 without providing other devices for supplying water to the journal bearing 242. That is, it is possible to secure the large effective area of the blades 223, and it is possible to improve the efficiency of the water-flow power generating apparatus 201.

In the above-described embodiment, the bearing unit 204 includes a lubricating oil supplying unit 243 that supplies lubricating oil to the thrust bearing 241. According to this configuration, since an oil lubricated bearing is used as the thrust bearing 241, as compared with, for example, a case where a water lubricated bearing is used as the thrust bearing 241, the dimensional physique of the apparatus can be made small. That is, the dimensional physique of the nacelle 207 can be made small sufficiently.

In an above-described embodiment, it is desirable that the diameter of the blade 223 is 20 m or more. According to this configuration, it is possible to improve the efficiency of the water-flow power generating apparatus more.

While the embodiment of the present invention has been described above, various changes to the above-described configuration can be made without departing from the spirit of the present invention. For example, in the above-described embodiment, an example where the bearing unit 204 includes a pair (two) of journal bearings 242 has been described. However, the number of the journal bearings 242 is not limited to two and may be three or four or more.

Figure 6:
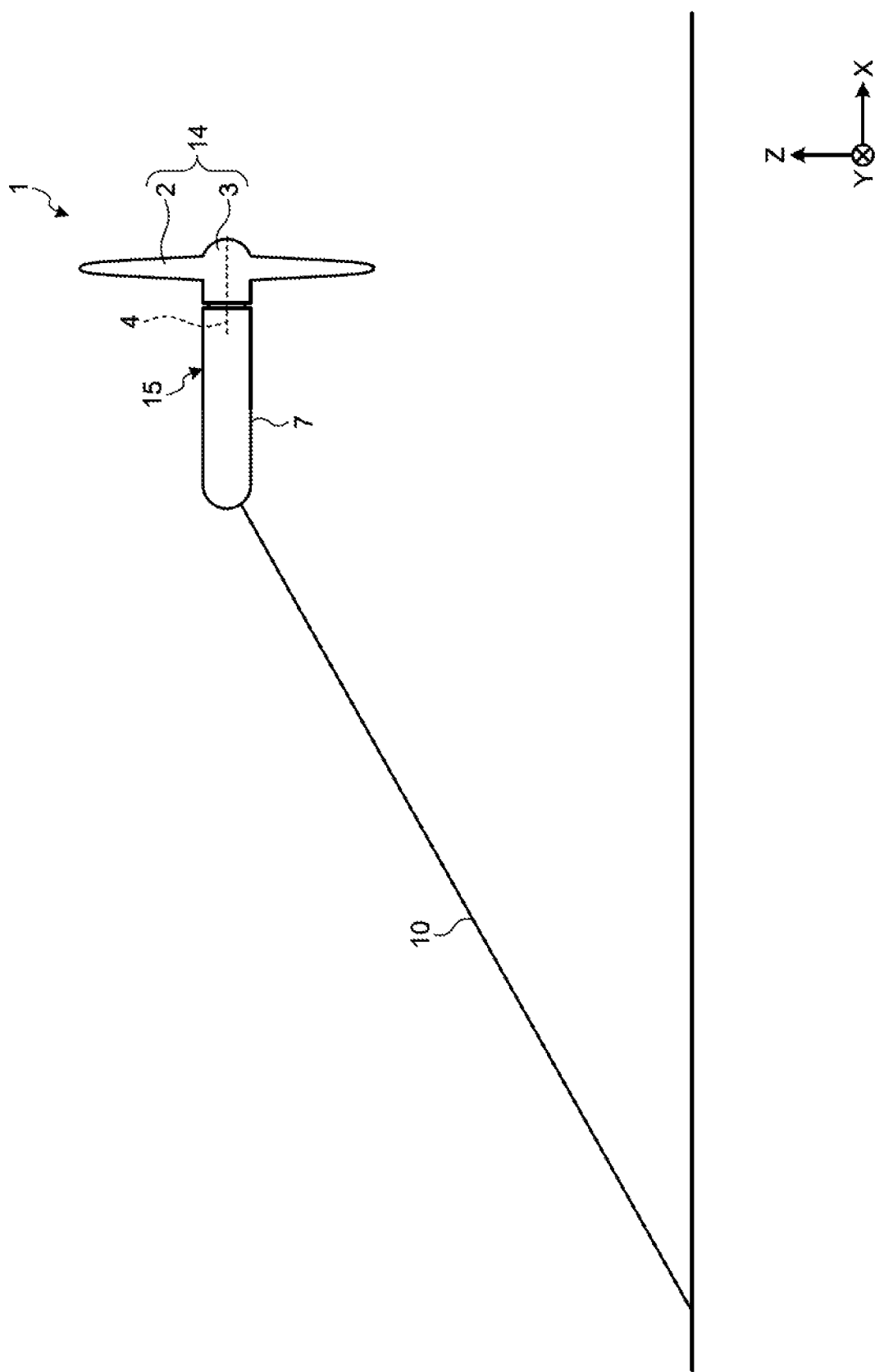
FIG. 6 is a schematic configuration diagram illustrating an example of a water-flow power generating apparatus according to an embodiment.
Figure 7:
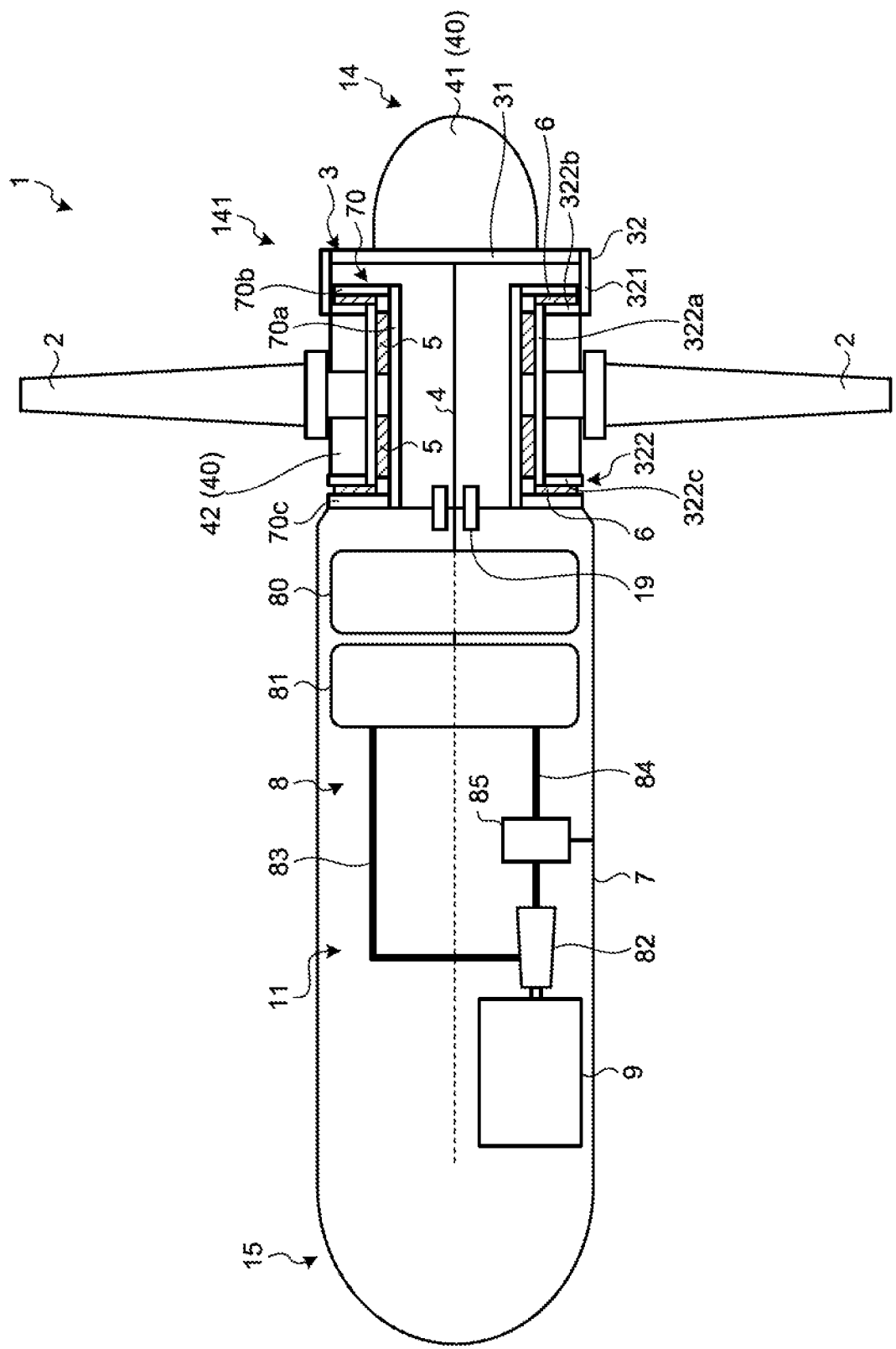
FIG. 7 is a schematic diagram illustrating an example of the water-flow power generating apparatus according to the embodiment.

FIG. 6 is a schematic configuration diagram illustrating an example of a water-flow power generating apparatus according to an embodiment, and FIG. 7 is a schematic diagram illustrating an example of the water-flow power generating apparatus according to the present embodiment. The water-flow power generating apparatus 1 according to the embodiment is disposed in the water and generates electricity with water flow energy. The water-flow power generating apparatus 1 is disposed, for example, in the sea and generates electricity with ocean current energy or tidal current energy. In this connection, the water-flow power generating apparatus 1 may be disposed in a river and may generate electricity with river-current energy.

The water-flow power generating apparatus 1 includes a rotor (rotary part) 14 including a rotor head 3 provided with a plurality of blades 2, a stator 15 including a nacelle 7 that supports the rotor 14 in a rotatable manner, a drive train 8 that is disposed in an inner space of the nacelle 7 and is connected to the rotor head 3, and a power generator 9 that is disposed in an inner space of the nacelle 7 and generates electricity with rotation energy of the rotor 14 transmitted through the drive train 8. The drive train 8 and the power generator 9 constitute a power generating unit 11 that generates electricity with a rotation force of the rotor 14.

In the present embodiment, the water-flow power generating apparatus 1 is the water-flow power generating apparatus 1 of an underwater floating system. As illustrated in FIG. 6, the water-flow power generating apparatus 1 is moored to the sea bottom through a cable (mooring cable) 10. The inner space of the nacelle 7 is filled with gas like air, and a space where the power generating unit 11 is disposed is made an air atmosphere. The blades 2 are attached to the rotor head 3. When an ocean current hits the blades 2, the rotor head 3 rotates with the ocean current energy acting on the blade 2. The rotation energy (rotation torque) of the rotor 14 is transmitted to the power generator 9 through the drive train 8 through the rotation shaft 4. The power generator 9 generates electricity with the rotation energy of the rotor 14 transmitted through the drive train 8. The rotation shaft 4 is fixed to the rotor head 3 and rotates together with the rotor head 3 to which the blades 2 are connected.

The rotation shaft 4 is inserted in the inside of the nacelle 7. Moreover, the rotation shaft 4 includes a portion (the first rotary part) on the rotor-head-3 side and a portion (the second rotary part) inserted in the inside of the nacelle 7. The first rotary part and the second rotary part may be connected by a non-illustrated coupling. In the water-flow power generating apparatus 1, a plurality (in the present embodiment, two) of journal bearings 5 and a plurality (in the present embodiment, two) of thrust bearings 6 are disposed between the rotor head 3 and nacelle 7. The rotor head 3 is supported in a state of being rotatable by the nacelle 7.

In the water-flow power generating apparatus 1, a seal bearing 19 is disposed between the rotation shaft 4 and the nacelle 7. In the seal bearing 19, a fixing portion thereof is fixed to the nacelle 7, and a rotating portion thereof is fixed to the rotation shaft 4, and the seal bearing 19 seals between the rotation shaft 4 and the nacelle 7 while supporting the rotation shaft 4 in a state of being rotatable. With this configuration, the water-flow power generating apparatus 1 can suppress sea water from flowing into the inside of the nacelle 7 from a portion where the rotation shaft 4 is inserted into the nacelle 7. As a result, the nacelle 7 serves as a boundary between a space in which the power generating unit 11 is disposed and the underwater in which the blades 2 are disposed. Moreover, in the case where a position on the rotor 14 where the rotation shaft 4 is supported by the seal bearing 19, forms a boundary, a portion of the rotor 4 disposed on the outside of the nacelle 7 is an exposed portion 141 of the rotor 14 that is exposed in the water.

The electric power generated by the power generator 9 is sent to the ground through an electric power transmission cable. Since the water-flow power generating apparatus 1 of an underwater floating system floats in the sea through the cable 10, there is an advantage that the water-flow power generating apparatus 1 is not likely to receive the influence of wind and wave.

In the present embodiment, the drive train 8 is a hydraulic drive train. The drive train 8 includes a brake 80 connected to the rotation shaft 4, a hydraulic pump 81 connected to the rotation shaft 4, a hydraulic motor 82 that is operated by the hydraulic pump 81, pipes 83 and 84, and a cooling unit 85. In the water-flow power generating apparatus 1, the rotation shaft 4 may be included in the drive train 8. The brake 80 is driven to stop the rotation of the blades 2. The brake 80 stops the rotation of the rotor 14 including the blade 2 by fixing the rotation shaft 4 and making the rotation shaft 4 into a state where it does not rotate. The hydraulic pump 81 pressurizes a hydraulic oil with rotation of the rotation shaft 4 and discharges the hydraulic oil. The hydraulic motor 82 rotates the rotor 14 using the supplied high-pressure hydraulic oil. The pipe 83 connects an oil discharge port of the hydraulic pump 81 and an oil suction port of the hydraulic motor 82. The pipe 84 connects an oil discharge port of the hydraulic motor 82 and an oil suction port of the hydraulic pump 81. The hydraulic oil of the drive train 8 can flow through the pipe 83 and the pipe 84. The cooling unit 85 is provided on the pipe 84 and cools the hydraulic oil supplied from the hydraulic motor 82 to the hydraulic pump 81. In the drive train 8, when the rotor head 3 rotates, the rotation shaft 4 also rotates. The hydraulic pump 81 is operated using the rotation energy of the rotor head 3 transmitted through the rotation shaft 4. The hydraulic pump 81 supplies the hydraulic oil to the hydraulic motor 82 and drives the hydraulic motor 82. The hydraulic motor 82 operates the power generator 9. Alternatively, the cooling unit 85 may be one that pressurizes and supplies water as a lubricating fluid to the later-mentioned journal bearing 5 and thrust bearing 6. As long as the drive train 8 can transmit the rotation force of the rotation shaft 4 to the power generator 9, the drive train 8 may have any configuration.

Next, a supporting structure of the rotor 14 with respect to the nacelle 7 will be described. In the following description, the axial direction of the rotation shaft 4 is referred to as an "axial direction", and the radial direction of the rotation shaft 4 is referred to as a "radial direction".

As illustrated in FIG. 7, the rotor head 3 includes a bottom portion 31 whose center is connected to the rotation shaft 4, and a cylindrical side wall portion 32 that surrounds the rotation shaft 4 from an outer edge portion of the bottom portion 31 and extends in the axial direction. The side wall portion 32 includes a large diameter portion 321 connected to the bottom portion 31, and a blade connecting portion 322 connected to the large diameter portion 321. The blade connecting portion 322 includes a rotor side cylindrical portion 322a with a diameter smaller than the large diameter portion 321, a first rotor side flange portion 322b that protrudes from one end in the axial direction of the rotor side cylindrical portion 322a to a radially outer side and is connected to the large diameter portion 321, and a second rotor side flange portion 322c that protrudes from the other end in the axial direction of the rotor side cylindrical portion 322a to a radially outer side. In the rotor side cylindrical portion 322a, to the outer peripheral surface of its approximate center portion in the axial direction, the blades 2 are connected with a space interposed therebetween in the circumference direction.

Moreover, the nacelle 7 includes a rotor supporting part 70 that surrounds the rotation shaft 4, extends in the axial direction, and supports the rotor 14. The rotor supporting part 70 is formed one size larger than the blade connecting portion 322 following the shape of the blade connecting portion 322 provided on the side wall portion 32 of the rotor head 3. The rotor supporting part 70 includes a stator side cylindrical portion 70a that extends in the axial direction, a first stator side flange portion 70b that protrudes from one end in the axial direction of the stator side cylindrical portion 70a to a radially outer side, and a second stator side flange portion 70c that protrudes from the other end in the axial direction of the stator side cylindrical portion 70a to a radially outer side.

As illustrated in FIG. 7, in the water-flow power generating apparatus 1, the two journal bearings 5 are disposed between the rotor side cylindrical portion 322a of the blade connecting portion 322 provided on the side wall portion 32 of the rotor head 3 and the stator side cylindrical portion 70a of the rotor supporting part 70 provided on the nacelle 7. In the water-flow power generating apparatus 1, the thrust bearing 6 is disposed between the first rotor side flange portion 322b of the blade connecting portion 322 and the first stator side flange portion 70b of the rotor supporting part 70. In the water-flow power generating apparatus 1, the thrust bearing 6 is also disposed between the second rotor side flange portion 322c of the blade connecting portion 322 and the second stator side flange portion 70c of the rotor supporting part 70.

With this configuration, the rotor 14 is supported by the two journal bearings 5 so as to be rotatable feely in the radial direction with respect to the nacelle 7 and is supported by the two thrust bearings 6 so as to be rotatable feely in the axial direction with respect to the nacelle 7. In this way, the blade connecting portion 322 of the rotor head 3 to which the blades 2 are connected is supported by the journal bearings 5 and the thrust bearings 6 with respect to nacelle 7, thereby making it possible to stably support the rotor 14 and to suppress rotation fluctuation of the rotor 14. In the present embodiment, the journal bearings 5 and the thrust bearings 6 are a water lubricated bearing and are lubricated by sea water acquired from the circumference of the rotor head 3. As mentioned above, the water-flow power generating apparatus 1 may be one that pressurizes and supplies sea water as a lubricating fluid from the cooling unit 85 to the journal bearings 5 and the thrust bearings 6.

Figure 8:
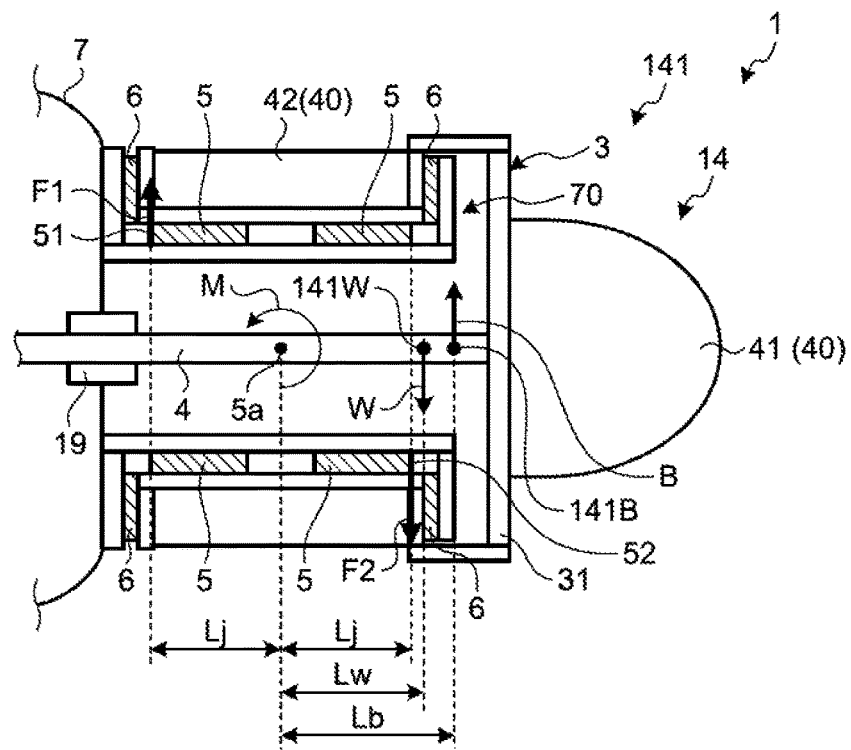
FIG. 8 is an enlarged cross-sectional view illustrating a neighborhood of an exposed portion of a rotor of the water-flow power generating apparatus.

Next, a plurality of buoyancy materials 40 attached to the rotor 14 will be described. FIG. 8 is an enlarged sectional view illustrating a neighborhood of an exposed portion of the rotor of the water-flow power generating apparatus. As illustrated in the drawing, an exposed portion 141 of the rotor 14 includes the buoyancy materials 40 provided with the center of gravity 141W of the exposed portion 141 interposed therebetween in the axial direction. The buoyancy materials 40 includes a first buoyancy material 41 and a second buoyancy material 42. The first buoyancy material 41 and the second buoyancy material 42 are formed with a low-density material and provide buoyancy to the exposed portion 141 of the rotor 14.

The first buoyancy material 41 is attached to a surface of the bottom portion 31 of the rotor head 3 on a side opposite to the nacelle 7. The first buoyancy material 41 is provided on a side opposite to the nacelle 7 with respect to the center of gravity 141W of the exposed portion 141. The second buoyancy material 42 is attached to an outer peripheral surface of the rotor side cylindrical portion 322a of the blade connecting portion 322 provided on the side wall portion 32 of the rotor head 3. The second buoyancy material 42 is provided on the nacelle-7 side with respect to the center of gravity 141W of the exposed portion 141. That is, the first buoyancy material 41 and the second buoyancy material 42 are provided with the center of gravity 141W of the exposed portion 141 interposed therebetween in the axial direction. In the present embodiment, as illustrated in FIG. 7, the second buoyancy material 42 is attached over the entire circumference to the outer peripheral surface of the rotor side cylindrical portion 322a while avoiding the attached portions of the blades 2. The second buoyancy material 42 may be attached to only a part of the outer peripheral surface of the rotor side cylindrical portion 322a.

With this configuration, it is possible to make the underwater weight (weight obtained by subtracting buoyancy acting in the water from a weight in the air) of the exposed portion 141 of the rotor 14 small, and it becomes possible to make a load applied to the journal bearings 5 and the thrust bearings 6 small. In the present embodiment, since the exposed portion 141 of the rotor 14 is formed in a vertically symmetrical structure, as illustrated in FIG. 8, the center of buoyancy 141B and the center of gravity 141W of the exposed portion 141 are disposed at respective positions that are lined in the axial direction. The first buoyancy material 41 and the second buoyancy material 42 are provided with the center of gravity 141W of the exposed portion 141 in the axial direction interposed therebetween, so that it is possible to equalize the buoyancy acting on the exposed portion 141 of the rotor 14 on both sides, in the axial direction, of the center of gravity 141W. That is, the center of buoyancy 141B of the exposed portion 141 can be brought close to the center of gravity 141W.

As illustrated in FIG. 8, it is assumed that a distance from the center 5a in the axial direction of the two journal bearings 5 to the center of gravity 141W of the exposed portion 141 is "Lw", a distance from the center 5a of the two journal bearings 5 to the center of buoyancy 141B of the exposed portion 141 is "Lb", and distances from the center 5a of the two journal bearings 5 to each of one end 51 and the other end 52 are "Lj". The one end 51 and the other end 52 indicate one end and the other end in the axial direction in the case of considering the two journal bearings 5 as one integral bearing. Moreover, it is assumed that a reaction force of the radial direction that the one end 51 of the journal bearings 5 receives from the rotor supporting part 70 of the nacelle 7, is "F1" and a reaction force of the radial direction that the other end 52 of the journal bearings 5 receives from the rotor supporting part 70 of the nacelle 7, is "F2". Moreover, it is considered here that the reaction forces received by the two journal bearings 5 from the nacelle 7 are collected at the one end 51 and the other end 52.

In the case where it is assumed that a force of a vertically upward direction is made positive, the following Formula (1) is established from balance among forces of vertical directions that act on the exposed portion 141. Moreover, it is assumed that a moment M of the counterclockwise direction in the drawing has acted around the center 5a of the journal bearings 5 by the weight W of the exposed portion 141 at the center of gravity 141W and the buoyancy B at the center of buoyancy 141B. In the case where it is assumed that the moment M of the counterclockwise direction in the drawing is made positive, the following Formula (2) is established from balance among moments that act on the journal bearings 5. Each of Formula (1) and Formula (2) is one that assumes that each of the reaction force F1 and the reaction force F2 is a vertically upward direction. On the basis of Formula (1) and Formula (2), a reaction force F1 that one end 51 of the journal bearings 5 receives is calculated by the following Formula (3), and a reaction force F2 that the other end 52 of the journal bearings 5 receives is calculated by the following Formula (4).

$$F1+F2-W+B=0 \quad (1)$$

$$M-Lj \cdot F1+Lj \cdot F2=0 \quad (2)$$

$$F1=(W-B)/2+(M/Lj)/2 \quad (3)$$

$$F2=(W-B)/2-(M/Lj)/2 \quad (4)$$

In the case where the moment M is positive (in the drawing, the counterclockwise direction), the reaction force F1 calculated by Formula (3) becomes a positive value and, as indicated with a solid line arrow in FIG. 8, becomes a force of a vertically upward direction that acts on an upper surface, in the drawing, of one end 51 of the journal bearings 5. Moreover, in the case where the moment M is positive (in the drawing, the counterclockwise direction), the reaction force F2 calculated by Formula (4) becomes a negative value and, as indicated with a solid line arrow in FIG. 8, becomes a force of a vertically downward direction that acts on a lower surface, in the drawing, of the other end 52 of the journal bearings 5. At this time, in the journal bearings 5, on sides that receive the reaction force F1 and the reaction force F2, one-side uneven contact occurs on a bearing surface.

From Formula (3) and Formula (4), it can be seen that as the moment M becomes smaller, the respective values of the reaction force F1 and the reaction force F2 become closer to each other. In the case where it is supposed that the value of the moment M is 0, the reaction force F1 and the reaction force F2 become the same direction and the same value, and one-side uneven contact does not occur on the bearing surface of the journal bearings 5. As the value of the moment M becomes smaller and the respective values of the reaction force F1 and the reaction force F2 become closer to each other, one-side uneven contact that occurs on the bearing surface of the journal bearings 5 becomes smaller. The moment M is calculated by the following Formula (5). From Formula (5), it can be seen that as a distance between the center of gravity 141W and the center of buoyancy 141B of the exposed portion 141 becomes smaller, that is, as the respective values of the distance Lw and the distance Lb are nearer to each other, the value of the moment M can be adjusted more easily. That is, as the respective values of the distance Lw and the distance Lb are nearer to each other, an extent that a difference between the weight W and the buoyance B of the exposed portion 141 contributes to the magnitude of the moment M becomes large, and thus, by adjusting a difference between the weight W and the buoyance B, it becomes easy to adjust the moment M to become small.

$$M=Lb \cdot B-Lw \cdot W \quad (5)$$

As mentioned above, the water-flow power generating apparatus 1 according to the present embodiment can bring the center of buoyancy 141B of the exposed portion 141 close to the center of gravity 141W. Therefore, the water-flow power generating apparatus 1 according to the present embodiment can make the moment M calculated by Formula (5) small easily, and thus, can bring the respective values of the reaction force F1 and the reaction force F2 calculated by Formula (3) and Formula (4) close to each other easily. In FIG. 8, in order to indicate the center of buoyancy 141B and the center of gravity 141W, the center of buoyancy 141B and the center of gravity 141W are illustrated so as to be separated comparatively largely. However, the center of buoyancy 141B and the center of gravity 141W are preferably positioned closer to each other. It is further preferable that the respective positions of the center of buoyancy 141B and the center of gravity 141W coincide with each other.

In the case where it is assumed that, among the reaction force F1 and the reaction force F2, a larger one is a reaction force Fbig and a small one is a reaction force Fsmall, in the water-flow power generating apparatus 1 according to the present embodiment, a ratio of a reaction force Fbig to a reaction force Fsmall is made 1.5 or less as indicated in the following Formula (6). In this way, by bringing the respective values of the reaction force F1 and the reaction force F2 close to each other and by making a ratio of the reaction force Fbig to the reaction force Fsmall 1.5 or less, it is possible to suppress a matter that one-side uneven contact occurs on the bearing surface of the journal bearings 5 and a surface pressure becomes high locally. In this connection, the ratio of the reaction force Fbig to the reaction force Fsmall is preferably smaller.

$$Fbig/Fsmall \leq 1.5 \quad (6)$$

Although it has been considered here that a reaction force that the two journal bearings 5 receive from nacelle 7 is to be collected to one end 51 and the other end 52, the journal bearings 5 receives a reaction force of a distributed load from the nacelle 7 along the axial direction. The matter that the ratio of the reaction force Fbig to the reaction force Fsmall is 1.5 or less in Formula (6), is not to be considered on the basis of forces obtained by collecting the reaction force to be received by the two journal bearings 5 from nacelle 7 into the one end 51 and the other end 52, but is to be considered on the basis of forces to be received by the one end 51 and the other end 52 among a reaction force of a distributed load to be received by the two journal bearings 5 from nacelle 7.

Figure 9:
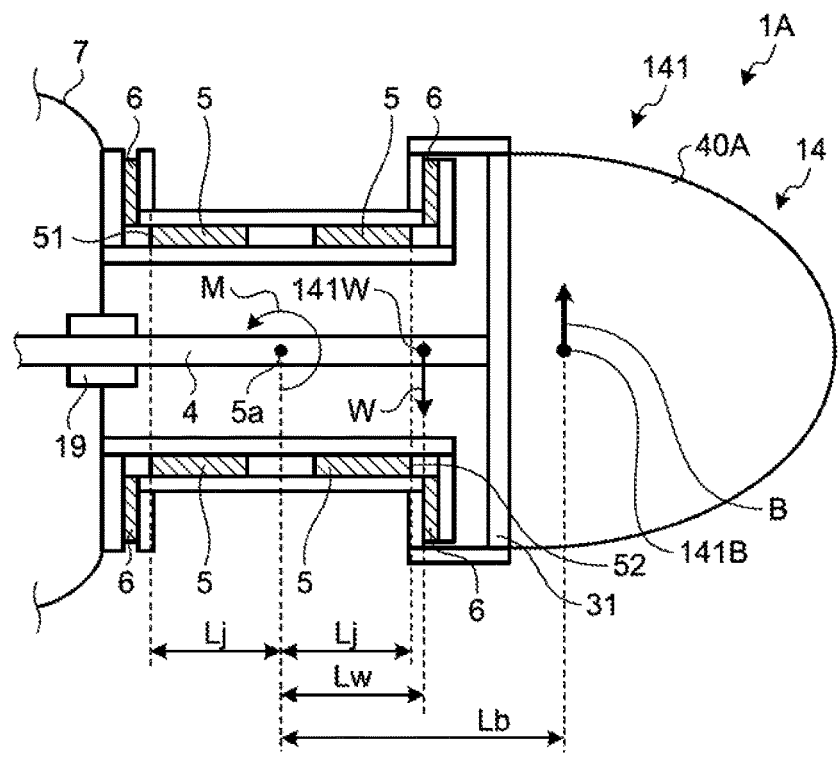
FIG. 9 is an enlarged cross-sectional view illustrating a neighborhood of an exposed portion of a rotor of a water-flow power generating apparatus as a comparative example.
Figure 10:
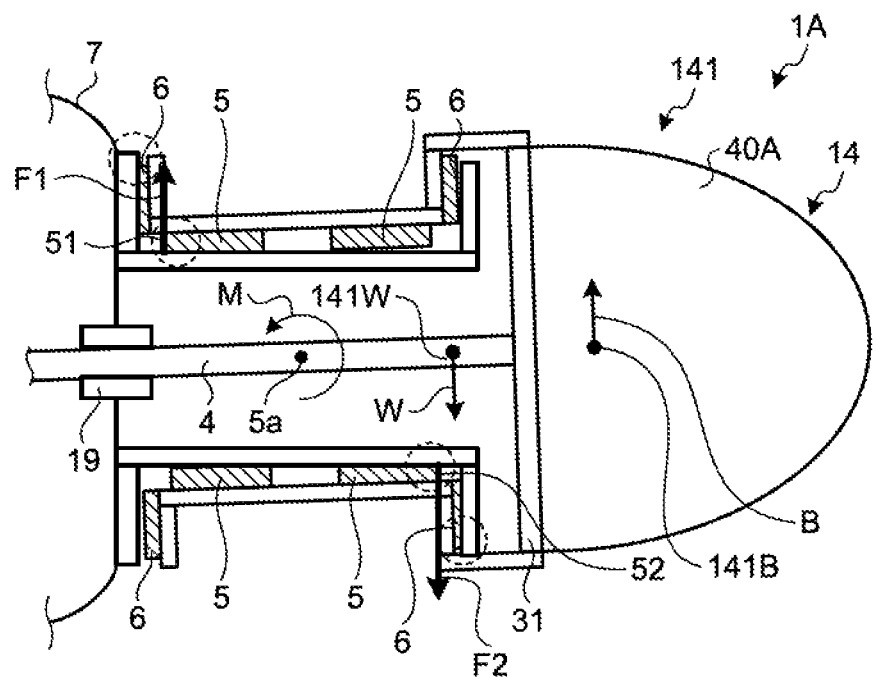
FIG. 10 is an enlarged cross-sectional view illustrating the neighborhood of the exposed portion of the rotor of the water-flow power generating apparatus as the comparative example.

FIG. 9 and FIG. 10 each are an enlarged cross-sectional view illustrating a neighborhood of an exposed portion of a rotor of a water-flow power generating apparatus as a comparative example. A water-flow power generating apparatus 1A as a comparative example includes a buoyancy materials 40A in place of the first buoyancy material 41 of the water-flow power generating apparatus 1 according to the embodiment. Moreover, the water-flow power generating apparatus 1A as a comparative example does not include the second buoyancy material 42 of the water-flow power generating apparatus 1 according to the embodiment. Because the other configurations of the water-flow power generating apparatus 1A are similar to those of the water-flow power generating apparatus 1, description for them is omitted.

The buoyancy material 40A is attached to a bottom portion 31 of a rotor head 3 similarly to the first buoyancy material 41. Moreover, the buoyancy material 40A is larger than the first buoyancy material 41, as illustrated in FIG. 9. Thereby, the magnitude of the buoyancy B that acts on the exposed portion 141 of the rotor 14 of the water-flow power generating apparatus 1A as a comparative example becomes the same as the magnitude of the buoyancy B that acts on the exposed portion 141 of the rotor 14 of the water-flow power generating apparatus 1 according to the embodiment. Moreover, the weight W of the exposed portion 141 of the water-flow power generating apparatus 1A as a comparative example is the same as the weight W of the exposed portion 141 of the water-flow power generating apparatus 1 according to the embodiment.

Since the exposed portion 141 of the rotor 14 of the water-flow power generating apparatus 1A as a comparative example does not include the second buoyancy material 42, the center of buoyancy 141B (refer to FIG. 8) is disposed at a position separated in the axial direction from the center of gravity 141W as compared with the center of buoyancy 141B of the exposed portion 141 of the water-flow power generating apparatus 1 according to the embodiment. That is, as illustrated in FIG. 9, a difference between a distance Lw from the center 5a in the axial direction of the journal bearings 5 to the center of gravity 141W of the exposed portion 141 and a distance Lb from the center 5a of the two journal bearings 5 to the center of buoyancy 141B of the exposed portion 141, becomes large. As a result, according to Formula (5), in the water-flow power generating apparatus 1A as a comparative example, the value of the moment M becomes larger than that in the water-flow power generating apparatus 1 according to the embodiment. Therefore, in the water-flow power generating apparatus 1A as a comparative example, among the reaction force F1 and the reaction force F2, the ratio of the reaction force Fbig of the larger one to the reaction force Fsmall of the smaller one becomes larger than that in the water-flow power generating apparatus 1 according to the embodiment. In the water-flow power generating apparatus 1A as a comparative example, as indicated in a range enclosed with a broken line in FIG. 10, one-side uneven contact that occurs on a bearing surface of the journal bearings 5 and the thrust bearings 6, becomes large. Accordingly, wear on the bearing surface becomes uneven, and a wear rate becomes faster. In this connection, in FIG. 10, in order to describe a matter that one-side uneven contact occurring on the bearing surface of the journal bearings 5 and the thrust bearings 6 becomes large, an extent of inclination of the whole rotor 14 relative to the axial direction is made larger than the actual one.

In contrast, in the water-flow power generating apparatus 1 according to the embodiment, as mentioned above, by bringing the center of buoyancy 141B of the exposed portion 141 close to the center of gravity 141W, the respective values of the reaction force F1 and the reaction force F2 can be brought close to each other easily. Moreover, among the reaction force F1 and the reaction force F2, the ratio of the larger one (reaction force Fbig) to the smaller one (reaction force Fsmall) is made 1.5 or less. As a result, as compared with the water-flow power generating apparatus 1A of a comparative example, it is possible to suppress one-side uneven contact occurring on the bearing surface of the journal bearings 5. Moreover, it is also possible to suppress one-side uneven contact occurring on the bearing surface of the thrust bearings 6, in a similar manner.

As described above, in the water-flow power generating apparatus 1 according to the embodiment, when the moment M acts on the exposed portion 141 by the weight W at the center of gravity 141W and the buoyancy B at the center of buoyancy 141B, among the reaction force F1 received from the nacelle 7 by one end 51 of the journal bearings 5 supporting the rotor 14 in the radial direction and the reaction force F2 received from the nacelle 7 by the other end 52, the ratio of the larger one (reaction force Fbig) to the smaller one (reaction force Fsmall) is 1.5 or less. Thereby, it is possible to equalize the reaction forces F1 and F2 received from the nacelle 7 by the one end 51 and the other end 52 of the journal bearings 5, and it becomes possible to suppress a matter that one-end uneven contact occurs on the bearing surface of the journal bearings 5 and a surface pressure increases locally. Therefore, according to the water-flow power generating apparatus 1 according to the present embodiment, it is possible to suppress wear of the bearing that supports the rotary part that rotates with the force of a water flow.

Moreover, the exposed portion 141 of the rotor 14 includes the buoyancy materials 40 provided with the center of gravity 141W interposed therebetween in the axial direction of the rotor 14. This configuration makes it possible to equalize buoyancy acting on the exposed portion 141 on both sides, in the axial direction, of the center of gravity 141W, and thus it is possible to bring the center of buoyancy 141B of the exposed portion 141 close to the center of gravity 141W. As a result, since it is possible to adjust the moment M so as to easily reduce the moment M that acts on the exposed portion 141 by the weight W at the center of gravity 141W and the buoyancy B at the center of buoyancy 141B, among a reaction force F1 received by one end 51 of the journal bearings 5 and a reaction force F2 received by the other end 52, it becomes easy to make the ratio of the larger one (reaction force Fbig) to the smaller one (reaction force Fsmall) 1.5 or less.

Moreover, the exposed portion 141 of the rotor 14 includes the bottom portion 31 and the cylindrical side wall portion 32 that extends in the axial direction from the bottom portion 31 towards the nacelle-7 side and to which the blades 2 are connected. The buoyancy materials 40 include the first buoyancy material 41 attached to the bottom portion 31 and the second buoyancy material 42 attached to the side wall portion 32. With this configuration, by utilizing the axial length of the cylindrical side wall portion 32 to which the blades 2 are connected, it becomes easy to dispose the second buoyancy material 42 on a side opposite to the first buoyancy material 41 with the center of gravity 141W of the exposed portion 141 interposed therebetween. That is, it is possible to dispose comparatively easily buoyancy materials 40 at respective positions with the center of gravity 141W therebetween in the axial direction.

In the present embodiment, although the first buoyancy material 41 is attached to the bottom portion 31 of the rotor head 3 and the second buoyancy material 42 is attached to the rotor side cylindrical portion 322a of the blade connecting portion 322 provided on the side wall portion 32 of the rotor head 3, the arrangement positions of the first buoyancy material 41 and the second buoyancy material 42 are not limited to this. For example, the second buoyancy material 42 may be attached to the blades 2, or the second buoyancy material 42 may be disposed in the inside of the blades 2.

Moreover, in the present embodiment, although the buoyancy materials 40 include the first buoyancy material 41 and the second buoyancy material 42, the buoyancy materials 40 may include three or more buoyancy materials.

Figure 11:
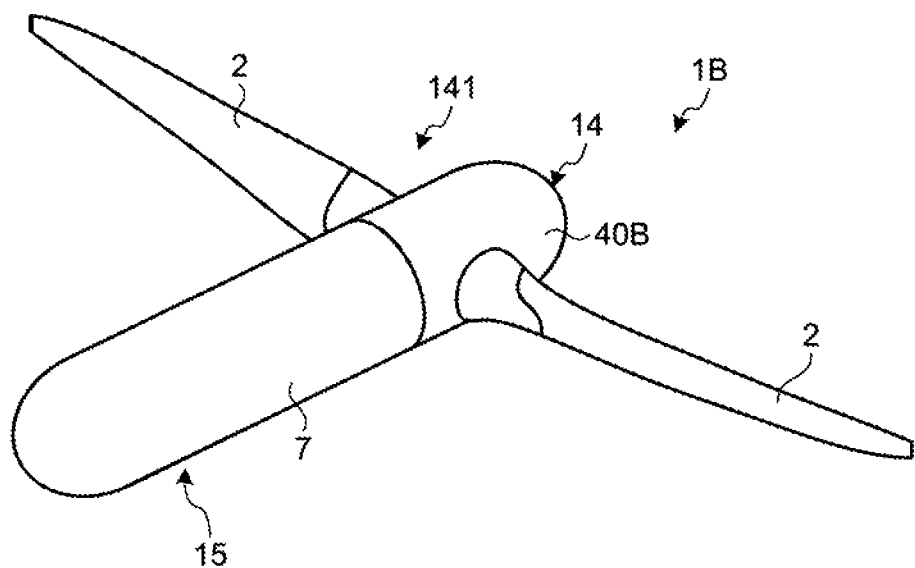
FIG. 11 is a perspective view of a water-flow power generating apparatus according to a modified example.

Moreover, the water-flow power generating apparatus 1 may include only one buoyancy material. FIG. 11 is a perspective view of a water-flow power generating apparatus according to a modified example. In FIG. 11, the illustration of a mooring cable is omitted. A water-flow power generating apparatus 1B according to the modified example includes a buoyancy material 40B in place of the first buoyancy material 41 and the second buoyancy material 42 of the water-flow power generating apparatus 1. Because the other configurations of the water-flow power generating apparatus 1B are similar to those of the water-flow power generating apparatus 1, description for them is omitted. As illustrated in the drawing, the buoyancy material 40B is a cylindrical member that accommodates portions other than the blades 2 of the exposed portion 141. This configuration makes it possible to equalize buoyancy acting on the exposed portion 141 on both sides, in the axial direction, of the center of gravity 141W, and thus it is possible to bring the center of buoyancy 141B of the exposed portion 141 close to the center of gravity 141W.

Moreover, in the present embodiment, although the two journal bearings 5 are disposed between the rotor side cylindrical portion 322a of the blade connecting portion 322 provided on the side wall portion 32 of the rotor head 3 and the stator side cylindrical portion 70a of the rotor supporting part 70 provided on the nacelle 7, as the journal bearings 5, at least one journal bearing may be disposed, or three or more journal bearings may be disposed. Moreover, in the present embodiment, although the journal bearings 5 and the thrust bearings 6 are used as different members, a journal bearing 5 and a thrust bearing 6 that neighbor each other may be constituted as an integrated one member. Moreover, at least either one of the journal bearings 5 and the thrust bearing 6 may be a bearing of an oil lubricated type disposed in an inner space of the nacelle 7.

REFERENCE SIGNS LIST

1, 1A, 1B water-flow power generating apparatus
2 blade
3 rotor head
31 bottom portion
32 side wall portion
321 large diameter portion
322 blade connecting portion
322a rotor side cylindrical portion
322b first rotor side flange portion
322c second rotor side flange portion
4 rotation shaft
5 journal bearing
5a center
51 one end
52 other end
6 thrust bearing
7 nacelle
70 rotor supporting part
70a stator side cylindrical portion
70b first stator side flange portion
70c second stator side flange portion
8 drive train
9 power generator
10 cable
11 power generating unit
14 rotor
141 exposed portion
141B center of buoyancy
141W center of gravity
15 stator
19 seal bearing
40, 40A, 40B buoyancy material
41 first buoyancy material
42 second buoyancy material
80 brake
81 hydraulic pump
82 hydraulic motor
83, 84 pipe
85 cooling unit
201 water-flow power generating apparatus
202 rotor
203 stator
204 bearing unit
205 drive train
206 power generator
207 nacelle
208 seal member
210 mooring cable
221 rotor main body
222 rotor head
223 blade
241 thrust bearing
242 journal bearing
243 lubricating oil supplying unit
244 flange portion
245 thrust bearing main body
246 journal fixing part
247 journal rotary part
251 hydraulic pump
252 hydraulic motor
H1 fixing part through-hole
H2 rotary part through-hole
H3 lubricant water discharging hole
J axis line
S sliding surface
V inner space

The invention claimed is:

1. A water-flow power generating apparatus that generates electricity with power of a water flow, the water-flow power generating apparatus comprising:
    a blade that rotates with power of the water flow;
    a rotary part that is connected to the blade and rotates integrally with the blade;
    a power generating unit that is connected to the rotary part and generates electricity with a rotation force of the rotary part;
    a nacelle that covers the power generating unit, forms a boundary between an inner space in which the power generating unit is disposed and an underwater in which the blade is disposed, and makes an inner space gas atmosphere;
    a journal bearing that is disposed between the nacelle and the blade and supports the rotary part from a radial direction orthogonal to an axial direction of the rotary part;
    a journal fixing part that is connected to the nacelle and extends in the axial direction from the nacelle toward an underwater side; and
    a journal rotary part that is provided with:
        a rotary part through-hole passing through the journal rotary part in the radial direction, so as to take in water in the underwater as a lubricant between the journal bearing and the journal rotary part, and
        one or more lubricant water discharging through-holes passing through the journal rotary part in the radial direction at a position different in the axial direction from the rotary part through-hole, so as to discharge the water as the lubricant.

2. The water-flow power generating apparatus according to claim 1,
    the journal bearing is fixed to either one of the journal fixing part and the journal rotary part.

3. The water-flow power generating apparatus according to claim 1, further comprising a thrust bearing that is disposed in the inner space and supports the rotary part from the axial direction of the rotary part, wherein
    the journal bearing is an oil lubricated bearing.

4. The water-flow power generating apparatus according to claim 3 wherein a bearing unit includes a lubricating oil supplying unit that supplies lubricating oil to the thrust bearing.

5. The water-flow power generating apparatus according to claim 1 wherein the blade has a diameter of 20 m or more.

6. The water-flow power generating apparatus according to claim 1, wherein the number of the lubricant water discharging through-holes is two, the lubricant water discharging through-holes are provided with an interval of 180 degrees in a circumferential direction when viewed from the axial direction of the rotary part.

\* \* \* \* \*